Feb. 3, 1959　　　　　　H. BERG　　　　　　2,872,258
PISTON RING FOR INTERNAL COMBUSTION ENGINES AND THE LIKE
Filed Aug. 29, 1955
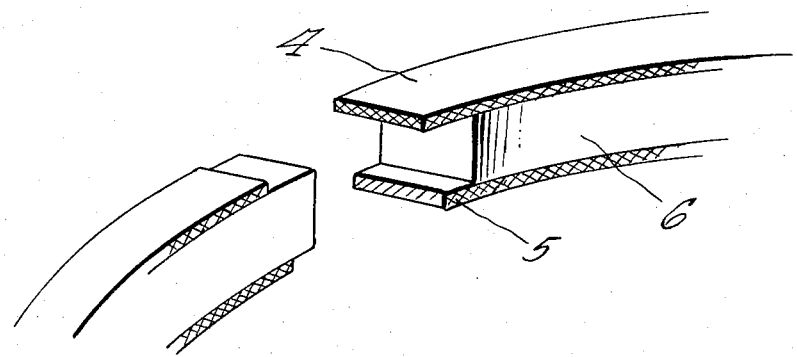
INVENTOR.
HEINZ BERG

2,872,258

PISTON RING FOR INTERNAL COMBUSTION ENGINES AND THE LIKE

Heinz Berg, Frankfurt am Main, Germany, assignor to Alfred Teves Maschinen- und Armaturenfabrik KG, Frankfurt am Main, Germany Application August 29, 1955, Serial No. 530,964

Claims priority, application Germany September 1, 1954

1 Claim. (Cl. 309—46)

The present invention relates to piston rings such as are used in combustion engines, compressors, and the like. The present invention is a further development of my copending application, Ser. No. 463,218 filed Oct. 19, 1954.

In that patent application, a piston ring is described which comprises one or several laminated steel rings and one or several plastic rings.

It is the object of the present invention to provide an improvement of the piston rings there described by decreasing the gas passage at the abutting ends of the rings.

In accordance with the present invention, this is done by staggering the abutting ends, so that they will dovetail upon contraction and form a positive lock. In general, the passage of the combustion gases is largest at the abutting ends of the ring, since they are not quite leakage-proof after assembly and in some cases are not in abutting relationship at all. By arranging the abutting ends in staggered dovetailing relationship, it is accomplished that at least one of the rings lies in sealing engagement with the cylinder walls, so that the gas will not escape freely into the crankcase.

The invention will now be more fully described with reference to the accompanying drawing, but it should be understood that the examples there given are by way of illustration and not of limitation and that many changes can be made in the details without departing from the spirit of the invention.

The single figure of the drawing is a perspective showing of a piston ring according to the invention.

The ring comprises two laminated steel rings 4 and 5, and one interposed plastic ring 6.

Due to the adherence of the steel rings to the plastic rings, the staggered relationship of the ends will remain unchanged during operation. If desired, an adhesive can be added for increasing the adherence of the several rings to each other.

What I claim is:

A piston ring for combustion engines, compressors, and similar devices, which comprises a plurality of superposed rings with their ends in staggered relationship which enables them to dovetail upon contraction, whereby said ends will become engaged in the manner of a lock, and wherein two laminated steel rings are combined with an interposed plastic ring.

References Cited in the file of this patent

UNITED STATES PATENTS

| | | |
|---|---|---|
| 2,030,927 | Marien | Feb. 18, 1936 |
| 2,330,104 | Antonelli | Sept. 21, 1943 |
| 2,485,862 | Caza | Oct. 25, 1949 |
| 2,554,008 | Burger | May 22, 1951 |

FOREIGN PATENTS

| | | |
|---|---|---|
| 23,806 | Great Britain | Oct. 31, 1902 |
| 492,080 | Great Britain | Sept. 14, 1938 |
| 515,230 | Great Britain | Nov. 29, 1939 |
| 583,348 | Great Britain | Dec. 16, 1946 |
| 522,616 | Germany | Apr. 11, 1931 |
| 286,735 | Italy | June 20, 1931 |